United States Patent
Foodman et al.

(10) Patent No.: US 6,547,131 B1
(45) Date of Patent: *Apr. 15, 2003

(54) PRESET AMOUNT ELECTRONIC FUNDS TRANSFER SYSTEM FOR GAMING MACHINES

(75) Inventors: Marc D. Foodman, Reno, NV (US); Dwight E. Crevelt, Las Vegas, NV (US); Robert A. Luciano, Reno, NV (US)

(73) Assignee: IGT, Reno, NV (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/450,814

(22) Filed: Nov. 29, 1999

Related U.S. Application Data

(63) Continuation-in-part of application No. 09/203,813, filed on Dec. 1, 1998, now abandoned, which is a continuation of application No. 08/639,762, filed on Apr. 29, 1996, now Pat. No. 5,902,983.

(51) Int. Cl.[7] ................................................. G06K 5/00
(52) U.S. Cl. ........................ 235/380; 235/375; 902/23; 463/25
(58) Field of Search ................................ 235/380, 381, 235/375, 382; 463/16–29; 902/23

(56) References Cited

U.S. PATENT DOCUMENTS

| 4,072,930 A | 2/1978 | Lucero et al. ................. 463/47 |
| 4,283,709 A | 8/1981 | Lucero et al. ................. 463/25 |
| 4,689,757 A | 8/1987 | Downing et al. .............. 377/14 |
| 4,764,666 A | 8/1988 | Bergeron ....................... 463/25 |
| 4,884,212 A | 11/1989 | Stutsman ...................... 700/237 |

(List continued on next page.)

FOREIGN PATENT DOCUMENTS

| CA | 2157872 | 3/1994 |
| DE | WO/96/00427 | 1/1996 |
| GB | 2294348 | 4/1996 |
| JP | 10216346 A | * 8/1998 |

OTHER PUBLICATIONS

"New Australian Gaming Complexes Usher in Era of Cashless, Card–Based Wagering," Card News, p. 3, Jun. 6, 1988.
Ringer, Richard, "Casino Machines to Accept Debit Cards," American Banker, vol. 145, p. 3, May 1983.
Dodwell, David, "Hong Kong Lends a Hand to Insatiable Gamblers," Financial Times, Friday, Apr. 8, 1988.
"Diebold Inc., Banking on an Industry's Needs for Security, Automation," Barron's/Investment News & Views, p. 44–45, Feb. 8, 1988.
"Cashless system: The Gaming of Tomorrow," Gaming & Wagering Business, vol. 5, No. 10, Oct. 1984.

(List continued on next page.)

Primary Examiner—Michael G. Lee
Assistant Examiner—Jamara A. Franklin
(74) Attorney, Agent, or Firm—Beyer Weaver & Thomas LLP

(57) ABSTRACT

A gaming machine is disclosed which includes apparatus necessary to send requests to and receive authorizations from an EFT system. All such requests for credit are limited to a preset amount, so that when a player uses an EFT transfer to obtain playing credit, that credit will be limited to no more than a specified amount. In practice, the player inserts his or her ATM card (debit card), keys in a PIN number, requests playing credit, and receives the preset amount of credit which can be converted to plays on the gaming machine.

29 Claims, 5 Drawing Sheets

U.S. PATENT DOCUMENTS

| | | | |
|---|---|---|---|
| 5,016,880 A | 5/1991 | Berge | 463/27 |
| 5,038,022 A | 8/1991 | Lucero | 463/25 |
| 5,113,990 A | 5/1992 | Gabrius et al. | 194/206 |
| 5,179,517 A | 1/1993 | Sarbin et al. | 463/25 |
| 5,222,583 A | 6/1993 | Bergmann et al. | 194/206 |
| 5,265,874 A | 11/1993 | Dickinson et al. | 463/25 |
| 5,277,424 A | 1/1994 | Wilms | 463/12 |
| 5,290,033 A | 3/1994 | Bittner et al. | 463/25 |
| 5,321,241 A | 6/1994 | Craine | 463/25 |
| 5,326,104 A | 7/1994 | Pease et al. | 463/18 |
| 5,371,345 A | 12/1994 | LeStrange et al. | 235/380 |
| 5,457,306 A | 10/1995 | Lucero | 235/380 |
| 5,470,079 A | 11/1995 | LeStrange | 463/25 |
| 5,557,086 A | 9/1996 | Schultz | 235/380 |
| 5,559,312 A | 9/1996 | Lucero | 463/25 |
| 5,663,547 A | 9/1997 | Ziarno | 235/380 |
| 5,902,983 A * | 5/1999 | Crevelt et al. | 235/380 |
| 5,919,091 A * | 7/1999 | Bell et al. | 463/25 |
| 5,959,277 A * | 9/1999 | Lucero | 235/380 |
| 6,030,288 A * | 2/2000 | Davis et al. | 463/29 |
| 6,053,813 A * | 4/2000 | Mathis | 463/26 |
| 6,340,331 B1 * | 1/2002 | Saunders et al. | 235/380 |
| 6,347,738 B1 * | 2/2002 | Crevelt et al. | 235/375 |

OTHER PUBLICATIONS

Arco Shifts to Pumping "plastic gas", p. 101, Sacramento Bee, May 2, 1986.

Murphy, Marvin, "Debit Cards could give Arco edge in West Coast Marketing" The Oil Daily, pp. 24–26, Mar. 20, 1986.

"Singapore Goes Cashless," Computer Age® EDP Weekly, vol. 27, No. 12, Mar. 24, 1986.

Mahoney, Robert W., "Expanding ATM Networks Draw Consumers' Interest," Computer World, Nov. 26, 1984, 2 pages.

"Electronic Banking: Emphasis on Education," Supermarket News, pp. 46, 48+1, May 7, 1984, 2 pages.

"ATMs Come to LIRR Platforms," Journal: NEWD, 1988.

Heide, Daniel, "Florida's Point–of–Sale Network Sets Pace," South Florida Business Journal, vol. 5, No. 34, p. 21, Apr. 29, 1985.

"Players Club International Signs contract with Cashchek International Inc.," PR Newswire, p. 25, Dec. 12, 1985.

"Camden County Installs Customer–Operated Charge–A– Bail System," May 13, 1987, 2 pages.

"Why Majors have the Cutting Edge in Proprietary Debit Cards," National Petroleum News, vol. 80, N. 12, Nov. 1988, 9 pages.

Godwin, Lisa, "Legislation Takes Cash Out of Casinos," Las Vegas Sun, Apr. 2, 1985.

Pasquet, Trinda, "Gamers Hope Cashless Slots will be Winner," Nevada State Journal, Oct. 11, 1985.

Mills, Ruth, "Slots that Take Credit Cards Latest Gambling Device", Sparks Tribune, Jul. 10, 1985.

Brumback, Nancy, "Foreign Retailers Experiment with Electronic Techniques", HFD, p. 14, Jul. 11, 1988.

Janice F. Cerveny, "Electronic Funds Transfer (EFT) Systems", pp. 505–507.

Kirkman, Patrick, "Point–of–Sale Transactions", Electronic Funds Transfer Systems, The Revolution in Cashless Banking and Payment Methods, pp. 69 and 70 and 149–170, Published 1987.

"Casinos Offered New Money Transfer System," Loose Change, Apr. 1985.

Beauchamp, Marc, "*Spreading his Bets*," Forbes, vol. 142, No. 11, Nov. 14, 1988.

Hevener, Phil, "Gaming Gambit," Las Vegas Sun, Jun. 13, 1985.

"Plastic Losses," Newsweek, Sep. 23, 1991.

Waddell, Lynn, "Credit Card Gambling Likely Coins could become Obsolete," Las Vegas Sun, Oct. 1990.

Dye, Tom, "Cashless Casinos Considered," Las Vegas Review Journal, Jun. 3, 1990.

Health, Sally, "Tabaret still waiting for main chance," Melbourne Press, Mar. 19/20, 1990.

"New one–armed bandits will accept credit cards," San Francisco Examiner.

"Cashless Casinos," Forbes, Apr. 29, 1985, p. 10.

Paul Schreiber, "He'll Lay You 8–5 Cashless Bets Catch On," Newsday, Dec. 24, 1990.

Glover, Kara, "Southland Coinless Slot Machines Company Bets on $5 Million IPO," Los Angeles Business, Mar. 1, 1993.

"Request" internal cash network for Caesars Casinos; system literature, prior to 1996.

Crevelt, Dwight E. and Crevelt, Louise G., "Slot Machine Mania," Gollehon, Grand Rapids, MI, 1987.

"Local Firm Touting Automated Telebetting System", Business First of Greater Columbus, Dec. 2, 1985, p. 9.

"For Sporting Punters, Life Can Be A Tabaret 24 Hours a Day", Unknown Publication, Unknown.

"Tabaret: A Ticket To Fun", The Sun, Mar. 8, 1990, p. 29.

Craig Dixon, "Pokie Row, Tabaret Games Illegal, says Lib", Believed to be printed by the Sun, Unknown Publication Date, 2 pages.

* cited by examiner

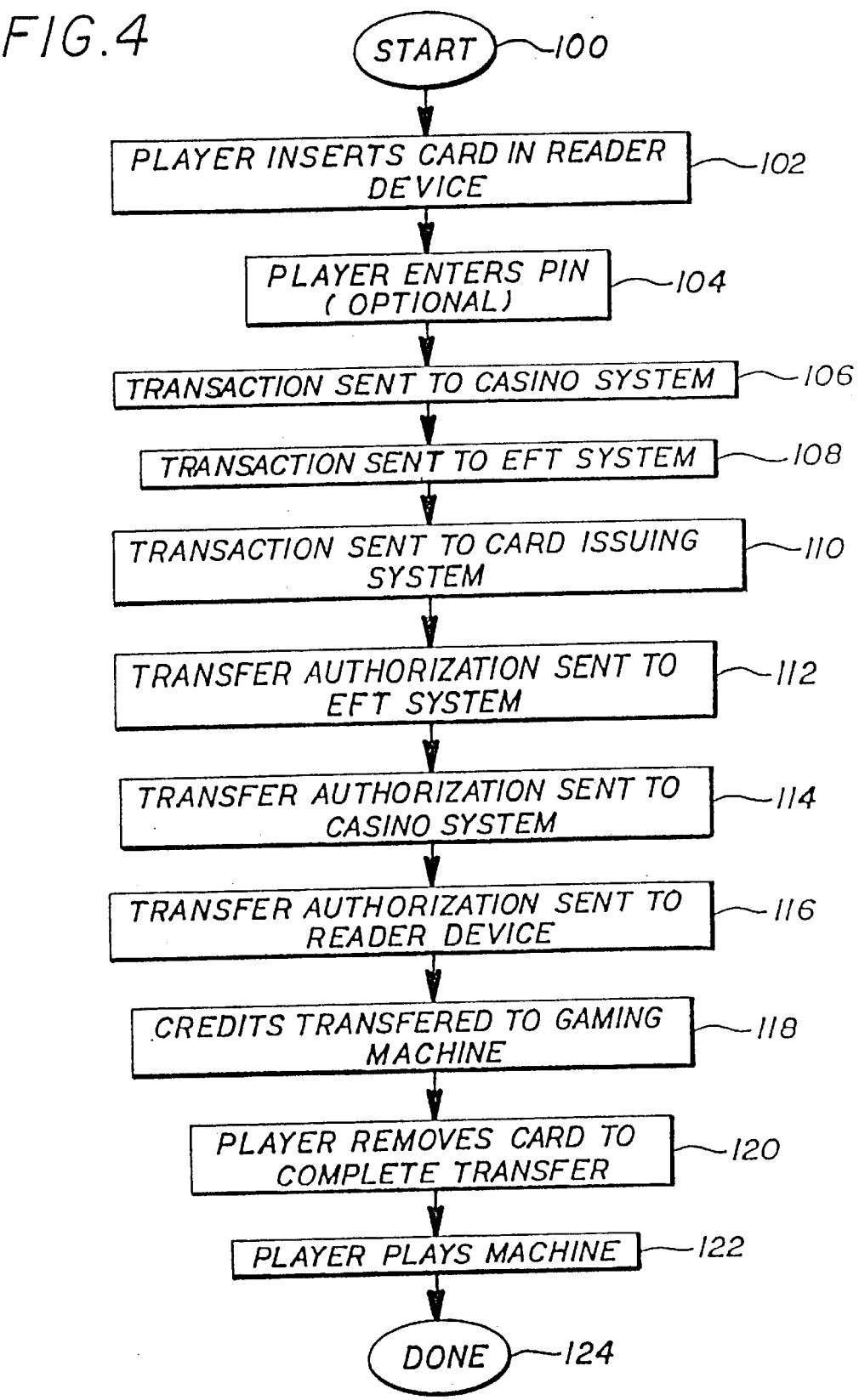

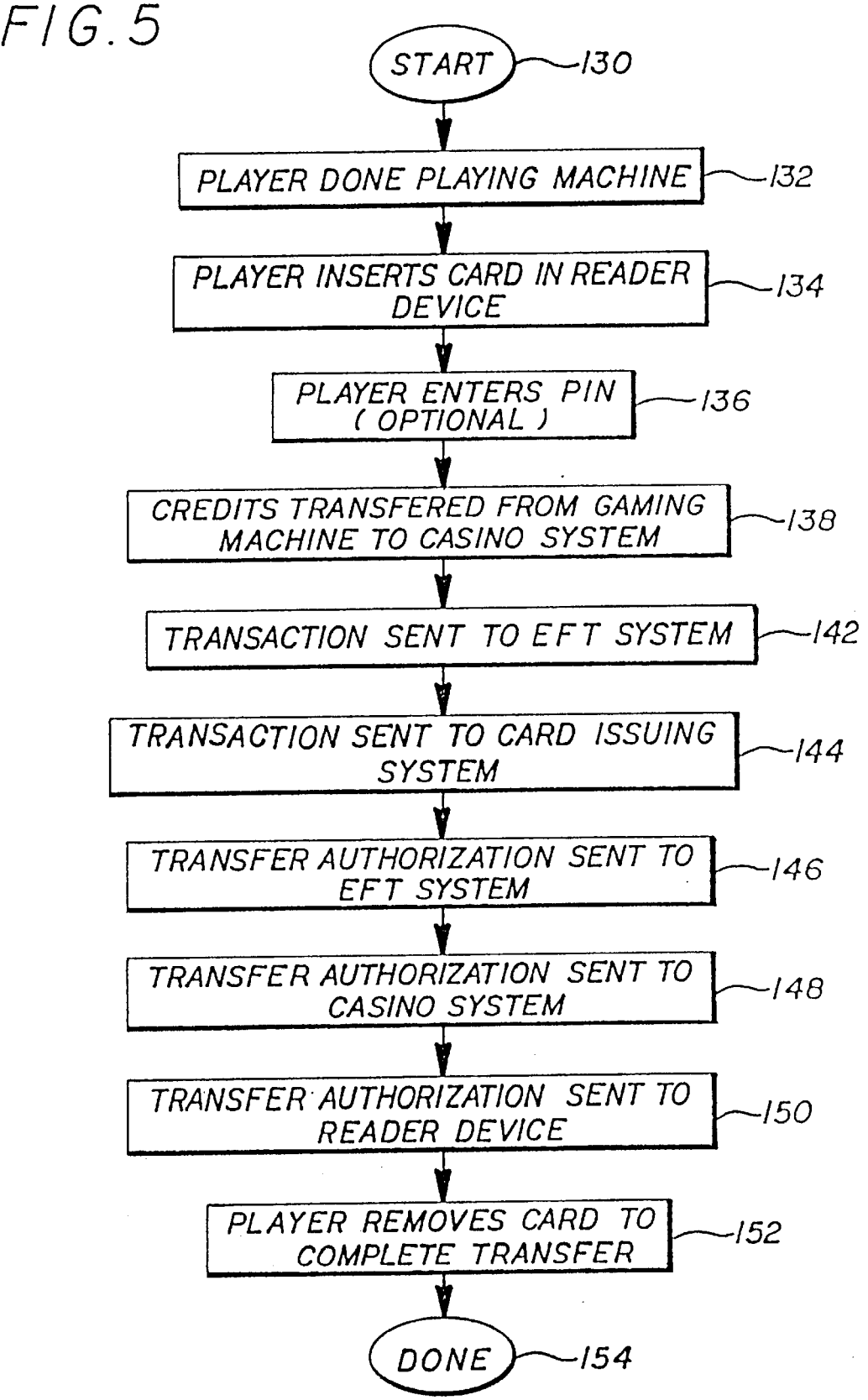

PRESET AMOUNT ELECTRONIC FUNDS TRANSFER SYSTEM FOR GAMING MACHINES

RELATED APPLICATION

This application is a continuation-in-part application based upon U.S. patent application Ser. No. 09/203,813, filed Dec. 1, 1998, and entitled PRESET AMOUNT ELECTRONIC FUNDS TRANSFER SYSTEM FOR GAMING MACHINES, now abandoned which is a continuation application of U.S. patent application Ser. No. 08/639,762, filed Apr. 29, 1996, now U.S. Pat. No. 5,902,983, and entitled the same.

BACKGROUND OF THE INVENTION

The present invention relates to methods and apparatus for controlling monetary transactions on gaming machines. More particularly, the invention relates to systems employing electronic funds transfer systems directly coupled to gaming machines for the purpose of obtaining playing credit.

Gaming machines are becoming increasingly sophisticated. Many slot machines, for example, now employ CRT video display screens in place of more traditional mechanically-driven reel displays. Further, poker and other games of chance are now commonly provided on video/electronic machines.

Currency handling apparatuses on gaming machines also are becoming more sophisticated. Where once only coin handling mechanisms were present on gaming machines, high denomination bill acceptors, capable of accepting $50.00 and $100.00 dollar bills, now find wide use. Such bill acceptors include advanced optical, magnetic, and electronic detectors used in conjunction with complex signal processing systems to identify counterfeit currency and prevent tampering.

Gaming establishments such as casinos have themselves adopted high technology solutions. For example, some casinos have connected their gaming machines to a local area network to monitor machine activity. In addition, some casinos now issue magnetic player identification cards which players use to obtain awards for frequent playing. A player holding such card inserts it in a card reader provided on a gaming machine before he or she begins play. Accounting software on the local area network then detects the card insertion, notes the player identity and follows the machine activity. In this manner, the casino tracks the gaming habits of various players.

Some casinos have even connected multiple local area networks to wide area networks spanning multiple casinos. Such wide area networks allow groups of slot machines at various casinos to be connected to one another for various purposes including use in "progressive" games. Progressive games allow jackpots from multiple machines in multiple locations to grow as one large jackpot (e.g., a million dollar jackpot for quarter (25 cent) slot machines).

Further, Automatic Teller Machines ("ATMs") are now frequently, found in casinos. Thus, casino patrons can access funds from their accounts at remote financial institutions (e.g., banks). Presumably, casinos install such ATMs so that the players will have a large supply of cash available to them to play casino gaming machines.

In the same vein, various groups have proposed "cashless" gaming machines. For example, in the 1980's, Kenilworth Systems Corporation of Plainview, N.Y. marketed a cashless system for gaming machines. This system employed a proprietary encoded card that could be inserted into a card reader on a gaming machine. The machine would then identify an amount of available funds recorded on the card and convert at least some of those funds to credit for playing the gaming machine. After the player had exhausted the transferred credit, he or she could pay a cashier to encode the card with additional credit for further plays.

More recently, it has been proposed to provide casino gaming machines with the electronics for Electronic Funds Transfer ("EFT") processing. Such systems were initially proposed by Crevelt in "Slot Machine Mania" pp. 225–226, Gollehon Books, Grand Rapids, MI (1988, 1989). The same general systems were later described in U.S. Pat. No. 5,038,022 issued to Lucero. Such references propose systems in which a player simply inserts his or her credit or debit card into a card reader on a gaming machine, enters his or her personal identification number ("PIN") on a keyboard, and then requests a desired amount of funds to be transferred from his or her remote financial institution to the local gaming machine. The requested funds transfer would then be approved by the institution, transferred to the gaming machine, and converted to credit to play that machine.

As contemplated by Lucero, this system would result in higher revenues for casinos, as gaming machine players would be able to remain at a given machine for an extended period of time without visiting a cashier or ATM machine. While this may be true, it unfortunately means that a small minority of susceptible individuals will tend to financially over extend themselves. Allowing such individuals to have direct and easy access to their entire bank accounts could, under certain circumstances, be financially ruinous. Thus, the system proposed by Lucero likely will be unpalatable to at least some legislatures which regulate gaming.

Thus, there exists a need for an EFT system that allows cashless transfers of funds to gaming machines and yet protects against rash decisions by some players to divert large amounts of their savings to gaming.

SUMMARY OF THE INVENTION

The present invention fills this need by providing a gaming machine with apparatus necessary to send "limited" fund requests to and receive authorizations from an EFT system. Specifically, all such requests for funds are limited to a preset amount. Thus, if a player uses an EFT transfer to obtain playing credit, that credit will be limited to the preset amount. For example, if a player is playing a quarter slot machine, the preset credit may be twenty dollars, while if the player is playing a dollar slot machine, the preset credit may be one hundred dollars. In practice, the player will insert his or her ATM card (debit card), key in a PIN number, request playing credit, and receive the preset amount of such credit. The player will not be given the opportunity to select an amount of playing credit other than the preset amount. Thus, the player is unlikely to financially over extend himself or herself when playing a gaming machine of this invention because there is a conscious decision made each time more funds are required to continue game play once a player has used up previously credited amounts.

In one aspect, the present invention provides a gaming machine which allows a player to transfer funds from a remote funds repository (e.g., a bank) via an electronic funds transfer system and convert the transferred funds into plays on the gaming machine. The gaming machine may be characterized as including the following features: (1) a game controller for controlling the play of a game; (2) a gaming machine interface for connecting the game controller to the electronic funds transfer system; and (3) a player interface connected to the gaming, machine interface. The player interface is capable of verifying the player's identity and identifying an account held by the player at the remote funds repository. The gaming machine interface is capable of at least (i) transmitting signals requesting playing credit not exceeding a preset amount to the remote funds repository, and (ii) receiving signals authorizing playing credit in the preset amount for the gaming machine from the remote funds repository.

The game controller preferably includes a processor and associated electronics for controlling the plays of a gaming device, interacting with player inputs, and providing results of a play. Thus, the game controller for a slot machine might control display of simulated rotating slot reels in response to the player initiating a play. The game controller also provides electronic signals indicating whether the player has won or lost, and if the player won, the payout size. The game controller operates in a similar fashion for a video poker or keno machine, as well as for other types of electronic gaming devices.

In preferred embodiments, the gaming machine interface includes functionality allowing it to request an electronic deposit of a payout from the gaming machine to the remote funds repository. Thus, such gaming machines can conduct electronic funds transfers in two directions: (1) depositing winnings from the gaming machine, and (2) withdrawing funds for use as gaming machine playing credit.

Preferably, the player interface includes a card reader for reading encoded information from a credit card or a debit card, a keypad for allowing the player to key in information (e.g., a personal identification number), and a display for displaying information pertaining to, at least, playing credit for the gaming machine. These items are widely available for various point of sale EFT applications and may, in accordance with this invention, be integrated into the gaming machine housing.

In another aspect, the present invention provides a method of using a gaming machine to obtain playing credit via an electronic funds transfer system. The method may be characterized as including the following steps: (1) at the gaming machine, determining that a player has requested playing credit from a remote funds repository, and (2) from the gaming machine, transmitting a request for playing credit in a preset amount over the electronic funds transfer system to the remote funds repository. Preferably, the transfer is completed by (3) receiving authorization (via the EFT system) from the remote funds repository for transferring the preset amount of playing credit to the gaming machine; and (4) crediting the player with the preset amount of funds to play the game.

Preferably, in the step of determining that a player has requested playing credit, the gaming machine determines that the player has initiated the request by inserting a credit card or a debit card into a card reader affixed to the gaming machine. Then, the machine automatically generates a request for the preset playing credit and transmits that request over a local area network located in an establishment where the gaming machine resides. The request is next sent to the EFT system which determines whether the remote funds repository has allowed the transaction. If so, the subsequent authorization from the remote funds repository is then received at the local area network in the establishment and forwarded to the gaming machine.

If a player wins, the gaming machine may be used to transfer a payout to the player's account at the remote funds repository. The method by which the gaming machine accomplishes this may be characterized by the following steps: (1) determining that a player has requested that the payout be transferred to the player's account at the remote funds repository; (2) transmitting a request via the electronic funds transfer system to deposit the payout to the player's remote funds repository; and (3) if the gaming machine receives a transfer authorization from the remote funds repository, completing the transfer. Should the gaming machine fail to receive a transfer authorization from the remote funds repository (possibly because the particular EFT system involved is not set up to accept deposits), the gaming machine will make the payout in cash or credit directly to the player.

In yet another aspect, the present invention provides a gaming machine which, like the machine described above, allows a player to obtain playing credit from a remote funds repository via an electronic funds transfer system. In this aspect, however, the machine first converts the transferred funds to tangible indicia of playing credit. Examples of such tangible indicia include a coupon for playing credit and a casino issued encoded card. While gaming machines issuing such tangible indicia are similar to the machines described above, they should have a player interface capable of (a) issuing the tangible indicia of playing credit, and (b) converting the tangible indicia of playing credit to actual playing credit on the gaming machine. Thus, the gaming machine may include a coupon issuing mechanism or a card encoder for encoding playing credit on a card issued by an establishment which controls the gaming machine (e.g., a casino). Preferably, the player interface also includes a card reader for reading encoded information from a credit card or a debit card. The player uses such credit or debit card as described above, but when the playing credit is transmitted to the gaming machine, it must first be converted to one of the tangible indicia described above.

These and other features of the present invention will be presented in more detail in the following detailed description of the invention and the associated figures.

BRIEF DESCRIPTION OF THE DRAWINGS

FIG. 4 is a process flow diagram illustrating the steps employed in obtaining playing credit for a gaming machine from a remote financial institution in accordance with this invention.

FIG. 5 is a process flow diagram illustrating the steps employed in depositing playing credit from a gaming machine to a remote financial institution in accordance with this invention.

DESCRIPTION OF THE PREFERRED EMBODIMENTS

Figure 1:
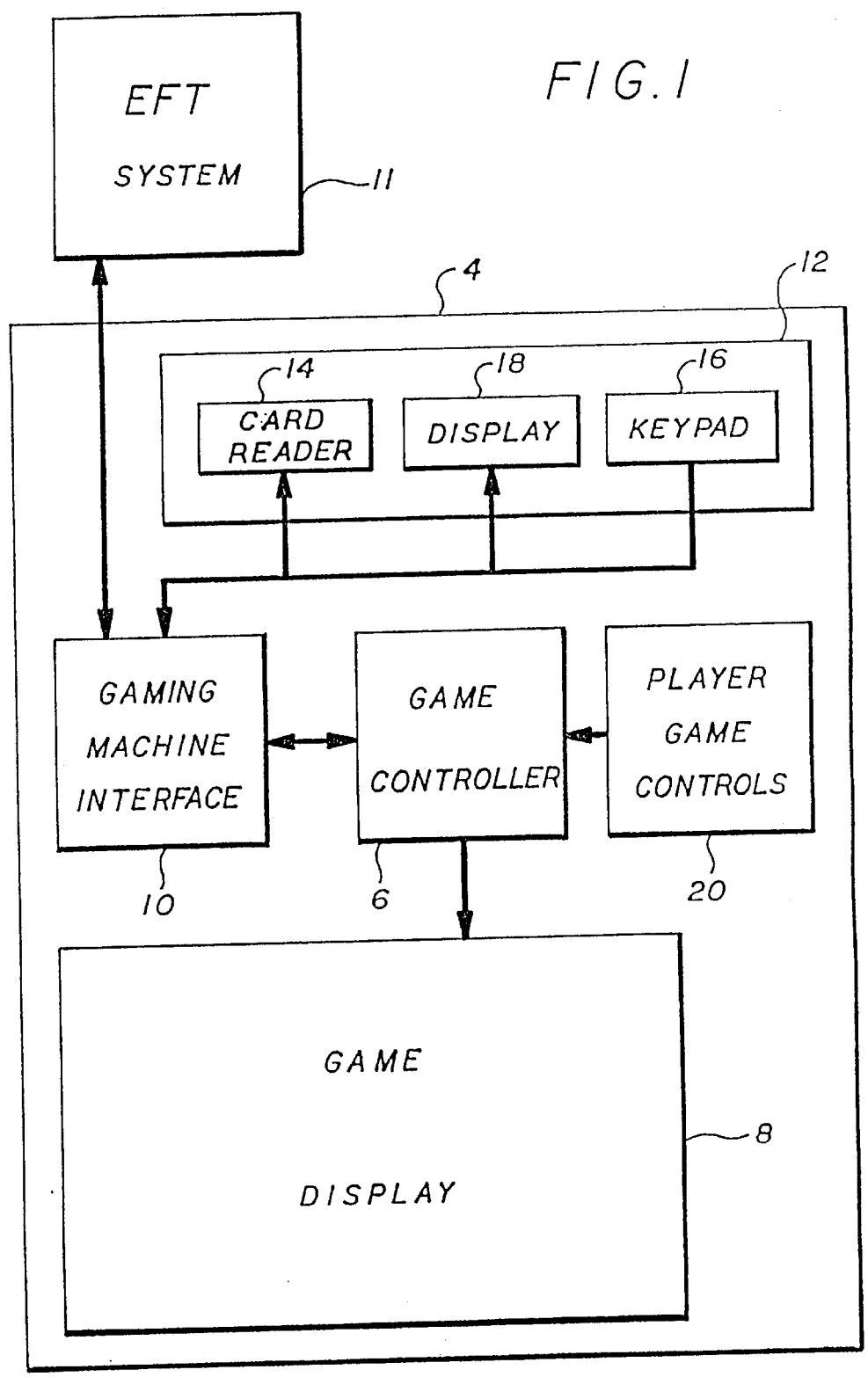
FIG. 1 is a block diagram showing a gaming machine configured with an EFT interface in accordance with one embodiment of this invention.

FIG. 1 is a block diagram of a gaming machine 4 designed in accordance with this invention. Gaming machine 4 includes an internal game controller 6 which controls the operation of a gaming device such as a traditional slot game, a progressive slot game, a video poker game, a keno game, a blackjack game, a lottery game, a multi-line game (with 8 or 15 pay lines), etc. In this regard, the game controller 6 recognizes player inputs and provides players with options at appropriate junctures in a game. It also controls the outcome of that game (applying the necessary random components). Controller 6 also controls a game display 8 which provides a graphical display (or mechanical display such as spinning reels) observed by a player while playing the game. The game controller typically includes a processor and associated memory, firmware, and software as necessary for controlling the game play. Such game controllers are now widely used in electronic gaming machines available from companies such as International Game Technology of Reno, Nev. and Bally Gaming, Inc. of Las Vegas, Nev.

Various player inputs to gaming machine 4 are provided to game controller 6 through a set of player controls 20. These may include, for example, control buttons, slot machine play handles, etc. located on an external surface of gaming machine 4. Such controls allow players to interact with the game by, for example, card selection in video poker, play initiation in slot games, etc. Other game control inputs may include a bill validator or other currency accepting apparatus which accepts currency and notifies the game controller 6 that credit for one or more game plays has been obtained.

A gaming machine interface 10 (optional) is bidirectionally coupled to the game controller 6. Preferably, it communicates with the game controller via a defined handshake protocol. Interface 10 is also bidirectionally coupled to an EFT system 11, preferably through a local area network (LAN) and/or a wide area network (WAN). It contains the hardware and software and/or firmware necessary to allow processing of information from both game controller 6 and EFT system 11. In the context of this invention, gaming machine interface 10 is specially programmed to communicate with such game controller and EFT system such that it can send electronic or optical signals requesting a funds transfer from a remote institution, and it can also receive signals authorizing such transfers to obtain plays on the gaming machine. Interface 10 can also receive and process information provided by game controller 6 regarding the progress of a game including any payouts to gaming machine interface 10.

Other functions of gaming machine interface 10 may include providing player tracking information, security information, and accounting information from machine 4 to a local area network in a casino or other establishment in which machine 4 is located.

A player interface 12 coupled directly to gaming interface 10 provides the mechanisms necessary for a player to initiate the funds transfers to and from EFT system 11. The player interface 12 may include a card reader 14, a display 18, and/or a key pad 16. Card reader 14 preferably can read encoded information on a debit or credit card. Suitable card readers can be obtained from various vendors such as Panasonic Corporation of Japan and Peripheral Dynamics, Inc. of Plymouth Meeting, Pa. The key pad 16 may be used to key in personal identification numbers (PINs) and any other information necessary to initiate and complete electronic funds transfers. Preferably, though not necessarily, it is a DES encryption PIN pad available from such sources as International Verifact of Toronto, Canada, Verifone of Redwood City, Calif. Preferably, the display 18 is a LED, LCD, vacuum fluorescent, or dot matrix alphanumeric display (having, e.g., a sixteen character, fourteen segment display) which displays information relevant to electronic funds transfers. Such display information might include, for example, a prompt to enter a personal identification number, a notice that a credit transfer was authorized, and an amount of the authorized transfer. Suitable displays may obtained from various vendors such as Futaba of Japan.

In an alternative embodiment, no gaming machine interface is used and the above-described functions of the gaming machine interface reside with the game controller 6. In this embodiment, the player interface 12 communicates directly with game controller 6, rather than with the interface 10 (as shown in FIG. 1).

In some embodiments, the debit or credit card may be dispensed with and some other means for verifying a player's identity and account used. Examples of such means include a key, a SMARTCARD, an electronic button, a finger print imaging device, a retinal scan, combinations of any of these, combinations a credit or debit card and any of the foregoing, etc.

The gaming interface 10 preferably includes software or firmware necessary to control the processing of user inputs through player interface 12. In this regard, it is important that the software or firmware automatically limit any EFT requests from the player to a preset amount. For example, if the gaming machine is a nickel slot machine the preset amount may be $20, if the gaming machine is a quarter slot machine, the preset amount might be $50, and if the gaming machine is a dollar slot machine, the preset amount may be $100. In general, the amount of transfer may be fixed by any measure such as the type or denomination of the gaming machine.

This approach should find ready user acceptance as most casinos now provide patrons with racks of playing currency in preset amounts. For example, if a player wished to play a quarter slot machine, he or she would receive $20 in quarters from a casino attendant in return for $20 in bills. In especially preferred embodiments, the player will not have the option of keying in any amount of currency. Rather, the gaming machine interface 10 will automatically send a request for transfer of the preset amount of funds to EFT system 11 after the player has inserted his or her card in the card reader 14 and entered his or her PIN on key pad 16.

In one alternative embodiment, the casino attendant could set or adjust the preset limit in response to some condition. For example, if the player meets specified credit criteria, the attendant could adjust the preset limit in response to the player's request. In such embodiment, the player still will not have the option of keying in or otherwise adjusting the preset amount of credit at the gaining machine.

In another embodiment, the preset amount or limit for a gaming machine may be set or specified by an institution other than a remote funds repository. Such institutions controlling the gaming machine in this manner, for instance, may include a gaming machine operator, a jurisdictional regulatory agency, a gaming machine manufacturer or a combination thereof. A gaming machine operator is intended to mean any operator of gaming machines that has such equipment in its facilities, including but not limited to: 1) a casino; 2) a route operator of the type typically found in the State of Nevada, or other entity that places gaming machines in a facility of another party such as bars, grocery stores, convenience stores, etc., and maintains and operates such equipment for a share of the revenues produces therefrom, or through some other formula for payment; 3) Government operated gaming machine halls located at racetracks or other venues; or 4) any other entity that has control over the operation of gaming machines. By way of example, a regulatory agency may specify a predetermined tier of preset limits of player credit for a gaming machine based upon a player meeting specified credit criteria. Subsequently, the gaming machine manufacturer may set these predetermined tiers of preset limits prior to shipment of the gaming machine or during installation at the gaming establishment. Alternatively, the gaming establishment may set or reset these predetermined tiers of preset limits should the regulatory agency change their criteria.

In general, the gaming machine 4 may accept any card issued by any institution where a player has an established account. The remote funds repository referred to herein is such card issuing and is generally any institution, business, or organization where the player has established an account. This may be a financial institution like a bank. The account may or may not be a cash account; it could be based upon credit, barter, or any other form of agreed upon value.

Figure 2:
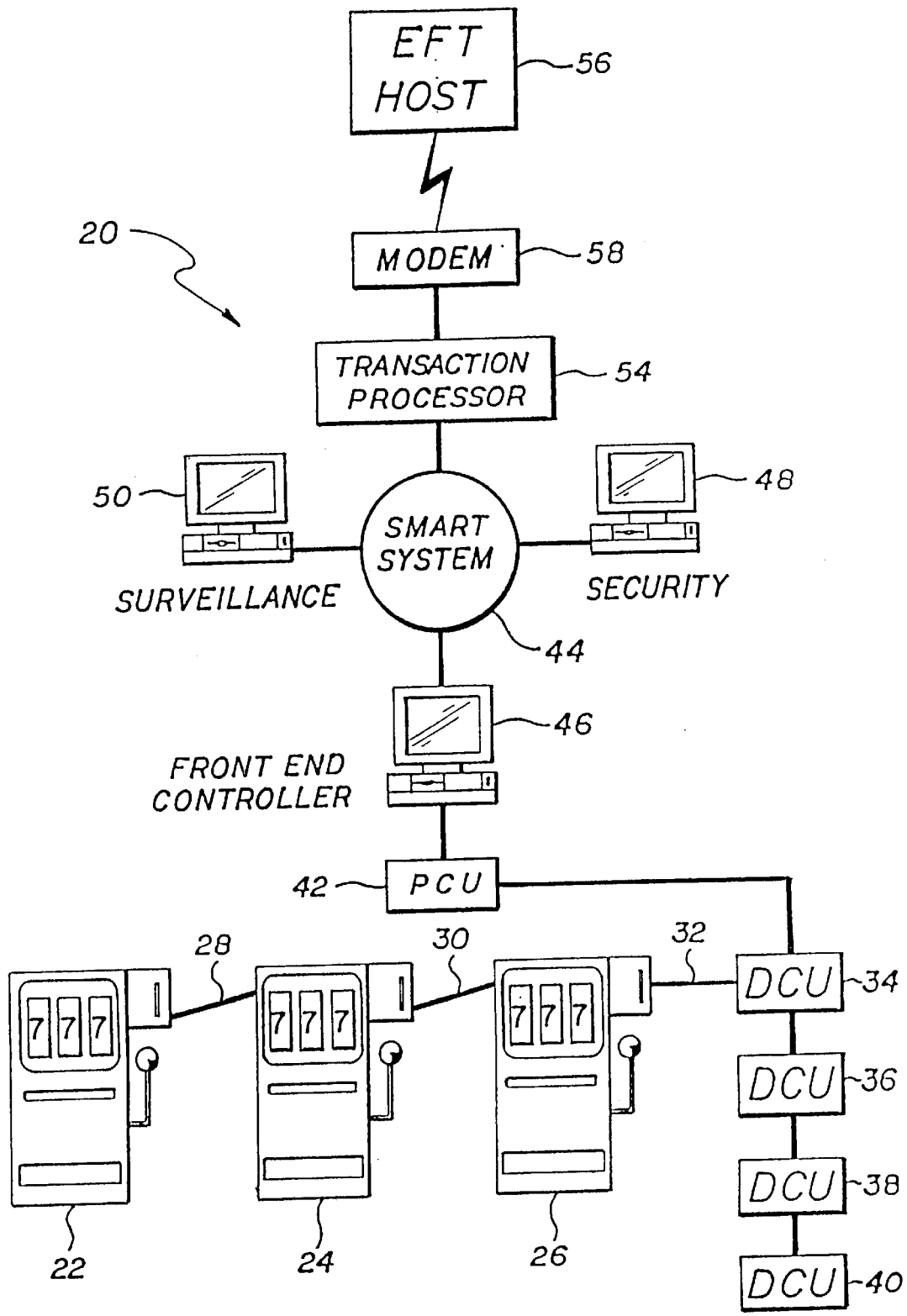
FIG. 2 is a schematic diagram of a casino local area network allowing electronic funds transfers between a remote institution and casino gaming machines in accordance with the present invention.

Turning now to FIG. 2, a casino communications network 20 in accordance with this invention is displayed. The system includes a number of slot machines 22, 24, 26, etc. connected to one another by lines 28 and 30 to form a floor communications network. Within this network, optional data collection units ("DCUs") such as unit 34 connected to machine 26 by a line 32 act as communications multiplexers for groups of gaming machines on the floor network. The DCUs preferably have some limited processing capabilities for the purpose of polling machines, storing and forwarding communications, etc. In one specific embodiment, a single DCU is coupled to thirty-two gaming machines. While the floor network physical connections among the individual gaming machines and corresponding DCUs may take various forms including wireless connections, in preferred embodiments, the floor network is provided on fiber optic cable.

In alternate embodiments, the DCUs may be replaced with direct connections to the slot machines. The DCUs simply provide greater adaptability to changes in the network configuration.

As there may be many groups of slot machines in a large casino or other establishment, multiple DCUs (such as DCUs 36, 38, and 40) may be necessary. The DCUs 34, 36, 38, and 40 are, in turn, connected by the floor communication network to a "plastic converter unit" ("PCU") 42 which serves to convert optical signals from the floor communication network to electrical signals which can be used by a current carrying network (and vice versa). In a specific embodiment, PCU 42 converts from fiber optic connections to RS-232 connections.

Plastic converter 42 is connected to a local area network 44 which preferably includes a number of computers or workstations as well as terminals, disk drives with fixed and/or removable media, printers and other peripherals connected on a token ring network. The computers on LAN 44 may provide the casino with various functions such as processing jackpots and fills, generating accounting reports and security reports, etc. Other components of the casino system may be multiplexers modems, and phone lines to an external EFT system. Of particular note in the context of this invention is a workstation 46 which acts as a front end controller to process signals from the various slot machines on the floor network, It continuously polls the various DCUs requesting information pertaining to transactions on the floor. The DCUs are, in turn, continuously polling the various slot machines. For example, if a debit card has been inserted in a gaming machine, that machine will communicate a card insertion event to its DCU in response to the next DCU poll. Then when the front end controller 46 polls the DCU, the DCU communicates the card insertion event.

In addition, a workstation 48 in charge of security and a workstation 50 in charge of surveillance are connected to token ring LAN 44. Each of the workstations on LAN 44, including the front end controller 46, may be any of a variety of commercially available computer systems. Such machines include, but are not limited to, PC compatibles, DEC VAXs, and UNIX machines. In preferred embodiments, the various network functions such as front end control are accomplished by distributed processing. In such cases, the network functions are performed on multiple nodes.

The token ring LAN 44 also includes a file server 54 which is the main processor in the network. Its functions will be described in more detail below with respect to FIG. 3. A suitable file server machine is the NR401 available from Tandem Computer Company of Cupertino, Calif. The file server 54 communicates with an EFT host 56 through a modem 58.

As is known to those of skill in the art, EFT hosts are typically mainframe computers which route electronic funds transfer requests and authorizations between various sales or services establishments (a casino in this instance), and remote funds repositories such banks or credit unions. Tandem Computer Company of Cupertino, Calif. provides many of the mainframe computers now used for this purpose. And ACI Company of Omaha, Nebr. provides much of the banking software or "switch processing" software used by most of the major networks around the world. The EFT system may also include workstations, printers, multiplexers, modems, etc. connected as a network and communicating with the casino the individual card issuing institutions over phone lines.

EFT host 56 may be provided by various widely used EFT service providers such as Cirrus™ and Interlink™. Such EFT service providers contract with various card issuing institutions (e.g., banks or other financial institutions) to provide EFT services. In some instances they also contract with one or more very large EFT service providers such as Maestro™ and Interlink™ which together provide EFT services for most of the available funds repositories.

In some preferred embodiments, the EFT host 56 will be provided and maintained by a casino or gaming machine vendor. All EFT requests from gaming machines of the vendor or casino would, in such cases, be routed through the private EFT host. In addition, the host could process ATM, check authorization, and point of sale transactions within the casino. In such embodiments, the casino or gaming machine vendor providing host 56 preferably contracts with the large service providers (e.g., Maestro™ and Interlink™), rather than contracting with the smaller providers or the individual funds repositories.

Figure 3:
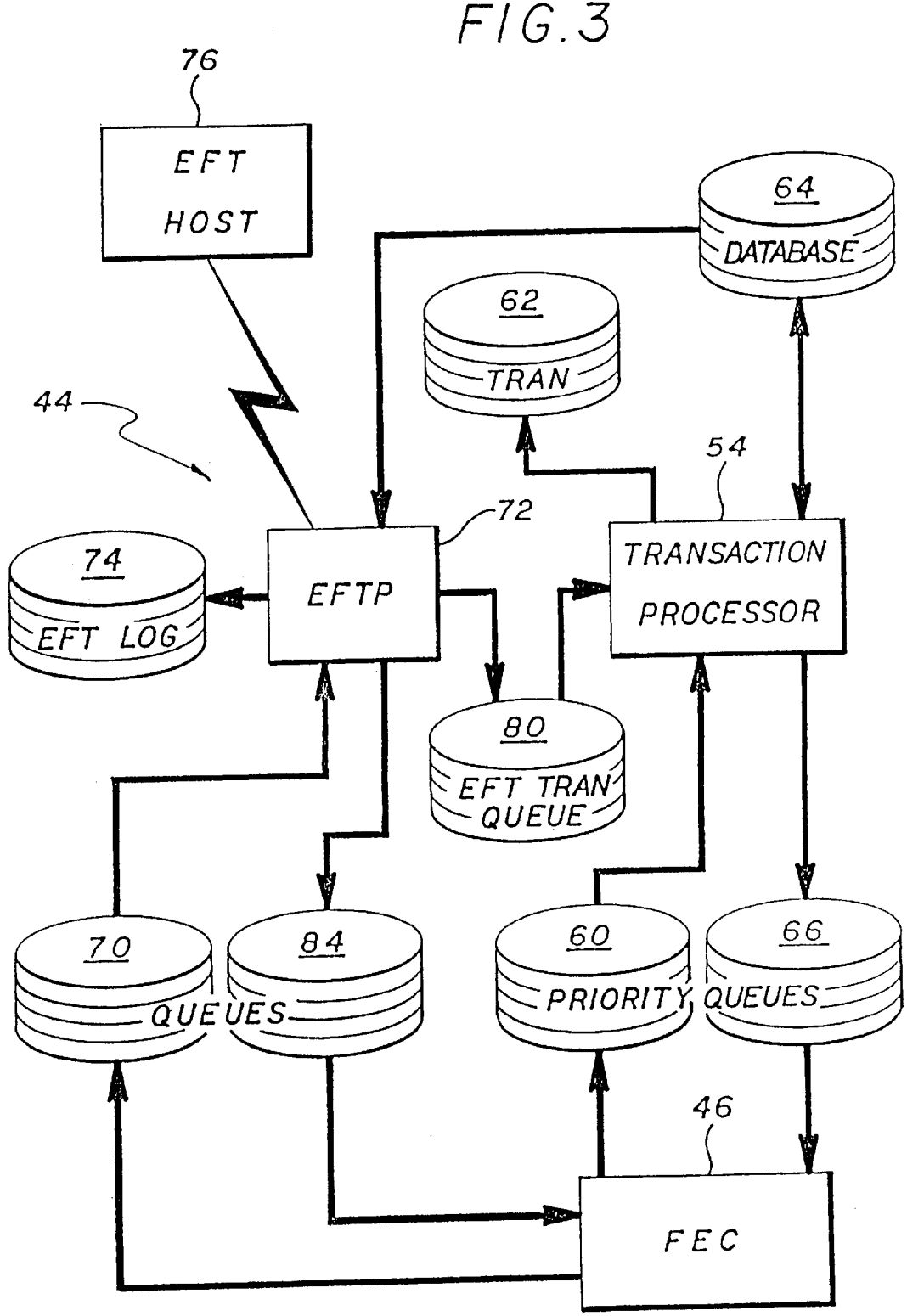
FIG. 3 is a schematic diagram detailing EFT-specific components of the FIG. 2 local area network.

FIG. 3 is a schematic diagram detailing the casino LAN 44 shown in FIG. 2. Data and events from the gaming machines on the floor processors are provided to front end controller 46 as described above. File server 54 continuously runs a process which handles all of the transactions. When front end controller 46 obtains a piece of information from the floor communications network, that piece of information is put in a priority queue 60 (a disk file). From there, the transaction is read by the transaction processor 54 which then acts on it as necessary. For example, transaction processor 54 may log the floor transaction in a log file 62 or store it in a 64. Examples of information sent from front end controller 46 to transaction processor 54 include gaming machine accounting data such as the number of coins in and out, how much money is in the drop, the jackpot size, etc. In this manner, the casino can obtain accounting reports about any given machine to track how that machine is performing.

If appropriate, transaction processor 54 can act on a transaction by forwarding its response to priority queue 66. From there, the front end controller 46 can read the response and act on it as appropriate (e.g., sending appropriate instructions to the floor network).

If an EFT event occurs at a gaming machine (e.g., a request for the preset playing credit), the front end controller 46 recognizes this as a special transaction and routes it to a separate "outgoing EFT queue" 70 from which it is read by an EFT processor 72. EFT processor then takes appropriate action including, for example, writing the transaction to an EFT log 74, routing the transaction to a remote EFT host 76, etc. In addition, the EFT processor 72 has read access to the main customer database 64 so that it can get account information, etc. Further, in order to keep the casino accounting information up to date, the processor 72 can write information to the main database 64—but only through transaction processor 54. Specifically, the EFT processor 72 writes changes to an EFT transaction queue 80 which is read by processor 54. Thereafter, processor 54 writes the change to database 64. Information passed from EFT processor 72 to transaction processor 54 might include, for example, electronic credits transferred in, electronic credits transferred out, etc. in order to meter each machine's "electronic drop".

Finally, the EFT queue can receive information from the EFT host 76 (e.g., EFT transaction authorizations) and send that information back to front end controller 46 through a queue 84. From controller 46, the EFT information is relayed back to the appropriate gaming machine over the floor network.

FIG. 4 illustrates the process by which a gaming machine and associated electronics are used to request and receive playing credit via an electronic funds transfer system in accordance with this invention. The process begins at 100 and then, in a step 102, a gaming machine detects that a player has inserted his or her credit or debit card into a reader device. Next, in a step 104, the gaming machine detects that the player has entered his or her PIN on the key pad 16. The system then encrypts that PIN and uses it to verify that the card matches the PIN. Step 104 may be optional, as PINs are often not provided with credit cards. Further, the debit or credit card itself may be replaced with some other identification/verification indicia such as a key, a SMARTCARD, an electronic button, a finger print imaging device, a retinal scan, combinations of any of these, combinations a credit or debit card and any of the foregoing, etc. SMARTCARDs generally describe cards having a computer processor for use in a secure payment system. In such systems, a PIN will be unnecessary.

After the PIN has been entered, a transaction request for a preset amount of playing credit is automatically generated and sent to a casino system such as the casino's local area network at a step 106. This step takes place without the user keying in a desired amount of playing credit. Rather, as noted above, the gaming machine interface software or firmware automatically generates a request for the preset amount of playing credit. As mentioned, that amount is set depending upon the type of machine to which the EFT terminal is affixed, as well as other factors.

The transaction request takes the form of one or more data packets sent from the gaming machine interface to the casino system pursuant to a defined handshake protocol. Upon receipt of the transaction request, the casino system may log the request for player tracking or other administrative purposes.

After the request for an electronic funds transfer in the preset amount is sent to the casino local area network (and logged as appropriate), a process step 108 forwards that transaction request to an EFT system (over the telephone lines for example). At this point, the EFT system treats the transaction request like any other that it might receive from a point of sale or ATM terminal. Specifically, the EFT system will forward the transaction request, at a step 110, to a system responsible for issuing the particular card used by the gaming machine player. That institution may be a remote funds repository such as a bank or it may be an EFT transaction processing organization such as Interlink™.

Assuming that the card issuing system approves the transaction, the signals representing the transfer authorization are sent back to the EFT system at a step 112. Thereafter, the EFT system routes the transfer authorization to the casino's local area network at a step 114. The casino system may then log the transfer authorization so that it can reconcile its daily settlement from the EFT system with the logged transaction statements that it has received from the EFT system.

From the casino system, the transfer authorization is sent back to the gaming machine from which the transaction request was initiated (see step 116). Upon receiving such authorization, the gaming machine interface will, at a step 118, automatically transfer playing credit which allow the player to play the gaming machine until the preset amount of funds (minus any processing fees) are exhausted or the player decides to stop play. This is accomplished by communication between the game controller and the machine interface according to a specified handshake protocol. Preferably, the protocol checks to ensure that the machine is in operable mode and can accept the amount of authorized credit. After the playing credit has been transferred to the gaming machine, and before the player begins playing, the gaming machine ejects the player's card from the card reader device to complete the transfer. Preferably, the EFT display displays a request for the player to remove his or her card at this point. The player then removes his or her card at a step 120 and may begin playing the machine at a step 122. The transaction is complete at 124. Optionally, the player may at this point, insert a casino issued card which meters the number of plays. As noted, such cards may be used for player tracking by the casino and for providing frequent playing awards.

FIG. 5 is process flow diagram indicating the steps by which a gaming machine and associated systems can allow a player to deposit his or her winnings to a designated remote funds repository. The process begins at 130 in this a step 132, the gaming machine determines that the player has finished playing the machine. Thereafter, at a step 134, the gaming machine determines that the player has inserted his or her credit or debit card in the reader device of the gaming machine. The gaming machine interface will then process any PIN entered by the player at a step 136. At this point, the gaming machine interface prepares and packages a request to make a deposit at the player's remote funds repository in the amount of the credits earned from a payout or remaining from unused plays of the gaming machine.

Next, at a process step 138, the gaming machine interface sends the deposit request to the casino system local area network (via a specified handshake protocol). Thereupon, the casino LAN sends the transaction request to the EFT system at a step 142, and from there the deposit request is sent to the card issuing system at a step 144.

Assuming that the card issuing system can accept the deposit, a process step 146 sends a transfer authorization back to the EFT system. That authorization is then routed through the casino LAN at a step 148 and then on to the gaming machine's reader device at a step 150. At that point, the card reader 14 would eject the player's card, and the display 18 would display a message such as "Transfer complete—Please remove your card." Finally, at a step 152, the gaming machine interface determines that the player has, in fact, removed his or her card from the gaming machine reader to complete the transaction. The process is completed at 154.

If for some reason, the authorization came back as negative (i.e., the deposit could not be made), the playing credits would be left on the machine. Thereupon, the gaming machine interface would eject the card and display a message such as "Transfer not possible—Please remove your card." The credits could then be cashed out from the machine hopper or as a hand pay from a casino attendant.

In an alternative embodiment, funds transferred from a player's remote financial institution are converted to plays on a gaming machine only after the player inserts a coupon into a coupon reader on the gaming machine. Such coupon is one form of "tangible indicia of playing credit" as that term is used herein. In this embodiment, the gaming machine is configured much like that of a machine of the above-described embodiment. However, rather than automatically issuing credit at the machine from which the EFT was requested, a coupon is issued when the player uses his or her ATM card. That coupon indicates playing credit available from an in-house account which can then be redeemed at one or more gaming machines in a casino (not necessarily the machine from which the coupon originated). The coupon value may or may not be limited to a preset amount. In other words, in some embodiments the player could "key in" a desired value. To implement this second embodiment, a gaming machine will contain, in addition to the EFT point of sale mechanism of the above embodiments, a coupon printer and a coupon reader coupled to appropriate electronics to permit the coupons to be converted to actual playing credit on the machine.

In a third embodiment, funds transferred from a player's remote financial institution are converted to plays on a gaming machine only after the player inserts into the gaming machine a casino issued debit card representing the value of the transferred funds. Such casino issued debit card is another form of "tangible indicia of playing credit" as that term is used herein. In this embodiment, the gaming machine includes the card reader and other EFT point of sale mechanisms of the first embodiment, and, in addition, a separate mechanism for reading a casino issued card. This mechanism may be incorporated into the card reader used for reading debit or credit cards. In this embodiment, the player would first use his or her debit card to transfer funds from his or her account at a financial institution to a casino account (in the player's name). The player would then insert a separate casino card to access his or her casino account and convert transferred funds to actual playing credit at a particular machine. In practice, the player would typically insert his or her debit card into the machine's EFT card reader, perform the necessary selections to transfer funds to a casino account, remove the debit/credit card, and then insert a casino card. The player could then select a desired amount of playing credit from the player's casino account. Like the coupons issued in the second embodiment, the casino cards could be used to play different machines within the casino.

Although the foregoing invention has been described in some detail for purposes of clarity of understanding, it will be apparent that certain changes and modifications may be practiced within the scope of the appended claims. For instance, although the specification has described an EFT interface on gaming machines, such interface may be used on other casino stations as well. For example, an EFT terminal of the type described above may also be used with black jack or craps tables. Further, the EFT systems of this invention are not limited to conventional casino gaming machines and stations, but may include other machines such as amusement machines, televisions, vending machines, etc. In addition, the reader will understand that the EFT terminals as describe herein can be with gaming machines that are not necessarily located in a casino or connected to a LAN. Thus, in some embodiments, the EFT gaming machines of this invention may be stand-alone machines located in bars, drug stores, or other establishments.

What is claimed is:

1. A gaming machine which allows a player to transfer funds from a remote funds repository via an electronic funds transfer system and convert transferred funds to plays on said gaming machine, the gaming machine comprising:

a game controller for controlling the play of a game;

a gaming machine interface for connecting the game controller to the electronic funds transfer system, said gaming machine interface being capable of at least (i) transmitting signals requesting playing credit in a preset amount set for the gaming machine which is based upon specified player credit criteria set by an institution and not by the remote funds repository, such that the player can not control the amount of requested playing credit, to the remote funds repository, and (ii) receiving signals authorizing the preset amount of playing credit for the gaining machine from the remote funds repository; and a player interface connected to the gaming machine interface, the player interface being capable of (i) verifying the player's identity and (ii) identifying an account held by the player at the remote funds repository.

2. The gaming machine of claim 1, wherein said institution is a regulatory agency specifying said preset amount.

3. The gaming machine of claim 1, wherein said institution is a gaming machine manufacturer.

4. The gaming machine of claim 1, wherein the player interface includes a card reader for reading encoded information from a credit card or a debit card.

5. The gaming machine of claim 1, wherein the player interface further includes a keypad for allowing the player to key in information.

6. The gaming machine of claim 1, wherein the player interface further includes a display for displaying information pertaining to at least playing credit for the gaming machine.

7. The gaming machine of claim 1, wherein the game controller provides at least one of the following games: a video slot game, a spinning reel slot game, an electronic video poker card game, a lottery, an electronic keno game, an electronic blackjack game, and a game having multiple pay lines.

8. The gaming machine of claim 1, wherein
the game controller can communicate data indicating a payout to the gaming machine interface.

9. The gaming machine of claim 8, wherein
the gaming machine interface is capable of transmitting signals for a request to deposit the payout to the remote funds repository.

10. The gaming machine of claim 1, wherein
the requests for playing credit in a preset amount and the authorizations to apply playing credit are electronic or optical signals.

11. The gaming machine of claim 1, wherein
the gaming machine interface forms part of the game controller.

12. The gaming machine of claim 1, wherein
the player interface is responsive to one or more of the following: a key, a SMARTCARD, an electronic button, a finger print imaging device, a retinal scan, a credit card, and a debit card.

13. The gaming machine of claim 1, wherein
said institution is a gaming machine operator.

14. A method of using a gaming machine to obtain playing credit via an electronic funds transfer system which playing credit can be directly converted to plays on the gaming machine, the method comprising:
  at said gaming machine, determining that a player has requested playing credit from a remote funds repository for plays on said gaming machine; and
  from said gaming machine, transmitting a request for playing credit set in a preset amount set for the gaming machine which is based upon specified player credit criteria set by an institution and not by the remote funds repository, such that the player can not control the amount of requested playing credit, over the electronic funds transfer system to the remote funds repository, wherein the preset amount can not be controlled by the player at the gaming machine.

15. The method of claim 14, wherein
said institution is a regulatory agency specifying said preset amount.

16. The method of claim 14, wherein
said institution is a gaming machine manufacturer.

17. The method of claim 16, further including:
setting the preset amount prior to shipment of the gaming machine.

18. The method of claim 16, further including:
setting the preset amount as specified by a second institution.

19. The method of claim 18, wherein
said second institution is a regulatory agency.

20. The method of claim 18, wherein
said second institution is a gaming establishment operator.

21. The method of claim 14, wherein
said determining that a player has requested playing credit determines that the player has initiated the request by inserting a credit card or a debit card in a card reader affixed to the gaming machine.

22. The method of claim 21, wherein
determining that a player has requested playing credit further includes determining that the player has entered a PIN on a keypad affixed to the gaming machine.

23. The method of claim 21, wherein
said determining that a player has requested playing credit further includes receiving information recorded on said player's credit or debit card which information identifies the remote funds repository.

24. The method of claim 21, wherein
said transmitting a request for playing credit includes first transmitting the request for said playing credit over a local area network located in an establishment where the gaming machine is located.

25. The method of claim 21, further comprising:
at said gaming machine, receiving authorization from the remote funds repository for transferring said preset amount of playing credit to said gaming machine, said authorization being provided from the electronic funds transfer system; and
crediting the player with said preset amount of funds to play said game.

26. The method of claim 25, wherein
said receiving authorization from the remote funds repository includes:
  receiving said authorization at a local area network in an establishment where the gaming machine is located; and
  sending said authorization from the local area network to said gaming machine.

27. The method of claim 14, wherein
the preset amount can be controlled by an attendant at a site remote from the gaming machine.

28. The method of claim 14, wherein
said determining that a player has requested playing credit verifies the identification of at least one of the player and the remote funds repository by one or more of the following: a key, a SMARTCARD, an electronic button, a finger print imaging device, a retinal scan, a credit card, and a debit card.

29. The method of claim 14, wherein
said institution is a gaming machine operator.

* * * * *